(12) United States Patent
Faure

(10) Patent No.: US 6,470,641 B1
(45) Date of Patent: Oct. 29, 2002

(54) ASSEMBLY DEVICE WITHOUT VISIBLE SCREWS FOR WOODEN SLATS

(76) Inventor: Didier Faure, 14 Chemin des Massards, F- 38660 Saint Hilaire du Touvet (FR)

(*) Notice: Subject to any disclaimer, the term of this patent is extended or adjusted under 35 U.S.C. 154(b) by 0 days.

(21) Appl. No.: 09/725,764

(22) Filed: Nov. 30, 2000

(30) Foreign Application Priority Data

Dec. 3, 1999 (FR) .......................................... 99 15286

(51) Int. Cl.$^7$ ................................................. E04B 5/52
(52) U.S. Cl. ........................... 52/480; 52/461; 52/467; 52/763; 52/391; 52/392; 52/479
(58) Field of Search ............................ 403/373, 408.1; 52/480, 393, 584.1, 489.1

(56) References Cited

U.S. PATENT DOCUMENTS

| | | | | |
|---|---|---|---|---|
| 2,088,625 A | * | 8/1937 | Wallace | 72/19 |
| 2,137,508 A | * | 11/1938 | Powell | 189/85 |
| 3,271,916 A | * | 9/1966 | Omholt | 52/393 |
| 3,518,800 A | * | 7/1970 | Tank | 52/480 |
| 4,170,859 A | * | 10/1979 | Counihan | 52/763 |
| 4,409,906 A | * | 10/1983 | Almeng | 108/64 |
| 5,660,016 A | * | 8/1997 | Erwin et al. | 52/483.1 |
| 6,065,255 A | * | 5/2000 | Stern et al. | 52/173.3 |
| 6,314,699 B1 | * | 11/2001 | West | 52/489.1 |

FOREIGN PATENT DOCUMENTS

| | | |
|---|---|---|
| AT | 400 611 B | 2/1996 |
| EP | 0 038 469 A1 | 10/1981 |
| WO | WO 97/04190 | 2/1997 |

* cited by examiner

Primary Examiner—Carl D. Friedman
Assistant Examiner—Basil Katcheves
(74) Attorney, Agent, or Firm—Oliff & Berridge, PLC

(57) ABSTRACT

An assembly device without visible screws for assembly of two parallel wooden slats comprises an intercalated fixing element engaged in two positioning grooves arranged side by side in the side faces. The fixing element comprises a metal slide having:
- a base part equipped with an oblong aperture extending longitudinally in the central part for the screw to pass through,
- two securing wings oriented in opposite directions from one another and designed to press in the grooves when the screw is tightened,
- and a screw head whose external dimension is greater than the visible second gap which is arranged above the grooves between the upper edges of the two wooden slats.

5 Claims, 4 Drawing Sheets

US 6,470,641 B1

ASSEMBLY DEVICE WITHOUT VISIBLE SCREWS FOR WOODEN SLATS

BACKGROUND OF THE INVENTION

The invention relates to an assembly device for assembling two parallel wooden slats without visible screws, comprising an intercalated fixing element engaged in two positioning grooves arranged side by side in the side faces of said slats separated by a first invisible lower gap, and a fixing screw working in conjunction with the fixing element to secure the two slats.

STATE OF THE TECHNIQUE

It is known to use an assembly device formed by a spacer in the form of a double wedge bearing on the oblique flanks of the juxtaposed wooden slats. The fixing screw is inserted after the spacer has been fitted, which requires a relatively large clearance between the slats to allow the head of the screw to pass.

Another conventional system consists in nailing or screwing the slats onto the sleepers by means of nails or visible screws passing directly through the slats. Moisture seeping up by capillarity is then liable to cause premature rotting of the wood.

Another blind fixing device makes use of a reversed U-shaped metal clamp fitted astride the sleeper. Screws are inserted obliquely via the bottom, which makes the assembly time longer and prevents any subsequent disassembly of the slats.

OBJECT OF THE INVENTION

The object of the invention is to achieve an assembly device without visible screws, not requiring any pre-drilling of the wooden slats and allowing assembly and disassembly to be performed from the front face of the slats.

The device according to the invention is characterized in that the fixing element comprises a metal slide having:

- a base part equipped with an oblong aperture extending longitudinally in the central part for the screw to pass through,
- two securing wings oriented in opposite directions from one another and designed to press in the grooves when the screw is tightened,
- and a screw head whose external dimension is greater than the visible second gap which is arranged above the grooves between the upper edges of the two wooden slats.

According to a preferred embodiment, the base part of the slide presents a U-shaped section, and a dish at the closed end of the aperture to house the screw head when the screw has been screwed fully tight. The external width of the base part determines said invisible first gap between the bottom edges of the two slats. The thickness of the second gap is smaller than that of the first gap and hides most of the head of the screw, except for the central part where the gripping indentation for a tool to grip is located.

According to one feature of the invention, the fixing element and the screw are made of stainless steel.

According to an alternative embodiment, the fixing element has two convergent opposite securing wings working in conjunction with at least one inclined bearing face of the positioning grooves arranged side by side in the side faces of the slats.

The invention also relates to a process for assembly of wooden slats to make a floor or an outside terrace, characterized by the following successive steps:

partially screwing at least one screw into a bracing sleeper so as to leave the head of the screw protruding out, then fitting two wooden slats parallel to one another in a direction perpendicular to the sleeper, inserting a fixing part in the form of a slide in the lateral grooves with a longitudinal sliding movement, and screwing the securing screw fully tight to achieve final securing of the two slats.

Pre-fitting of the screws and sliding of the fixing parts in the grooves of the wooden slats enables the separating gap between the different slats to be reduced to the minimum while allowing assembly and disassembly from the front face.

BRIEF DESCRIPTION OF THE DRAWINGS

Other advantages and features will become more clearly apparent from the following description of an embodiment of the invention, given as a non-restrictive example only, and represented in the accompanying drawings in which.

DETAILED DESCRIPTION OF THE PREFERRED EMBODIMENT

Figure 1:
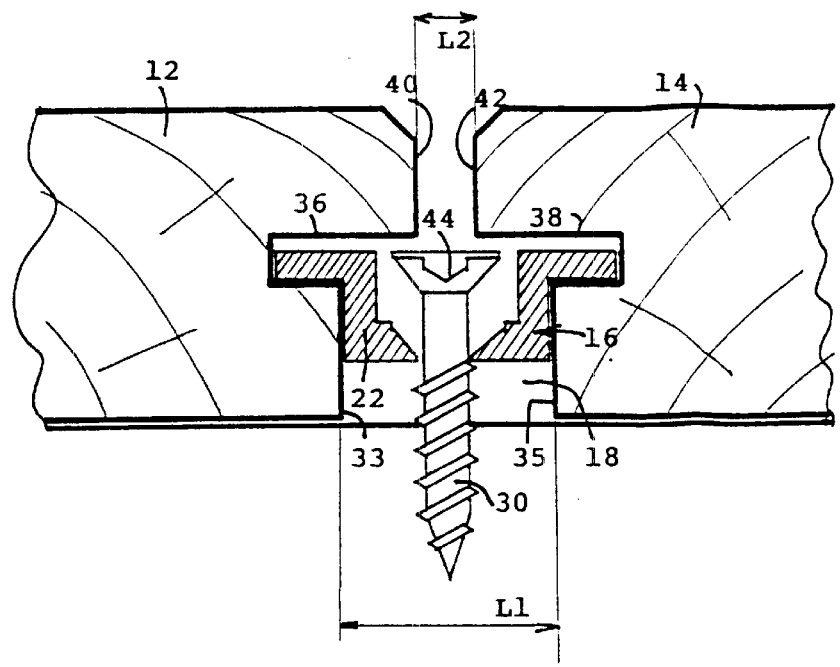
FIGS. 1 and 2 are schematic sectional views of the assembly device according to the invention, respectively in the pre-assembled position and in the end of tightening of the securing screw position.

With reference to FIGS. 1 to 5, a device 10 for assembly of two parallel wooden slats 12, 14 comprises an invisible fixing element 16 housed in a gap 18 arranged between the juxtaposed side faces of the slats 12, 14. The intercalated fixing element 16 comprises a metal slide 20 having a fixing base part 22 and two opposite securing wings 24, 26 oriented in opposite directions from one another.

The base part 22 presents a U-shaped section, and a bottom equipped with an oblong aperture 28 extending longitudinally in the central part for insertion of a screw 30 with a tapered head 32. The closed end of the aperture 28 is enlarged in the form of a dish 34 to house the screw head 32 when the screw 30 has been screwed fully tight. The external width of the base part 22 determines a first invisible gap LI between the bottom edges 33, 35 of the two slats 12, 14.

The two securing wings 24, 26 engage transversely in positioning grooves 36, 38 arranged side by side in the side faces of the slats 12, 14. The fixing element 16 and screw 30 are made of stainless steel.

The upper edges 40, 42 protrude out beyond the bottom edges 33, 35 so as to define a second gap 12 visible from outside and presenting a small thickness, allowing a tool to be inserted for tightening the screw 30. The second gap L2 is smaller than the first gap L1 and than the external diameter of the head 32 of the screw 30.

Figure 2:
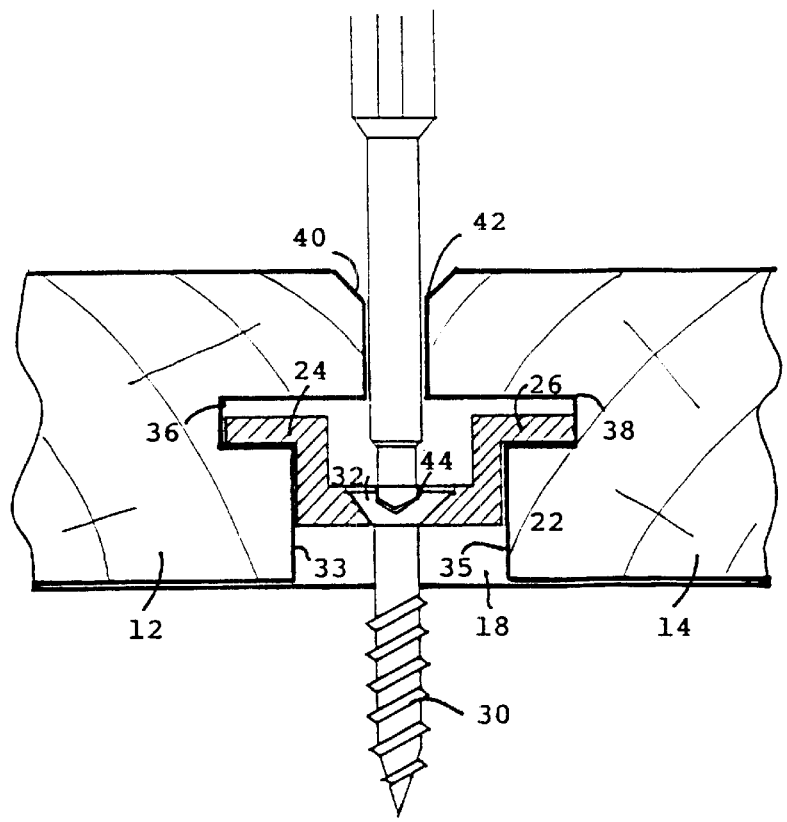
Figure 3:
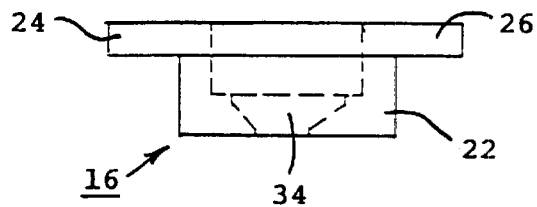
FIG. 3 shows an elevational view of the fixing element.
Figure 4:
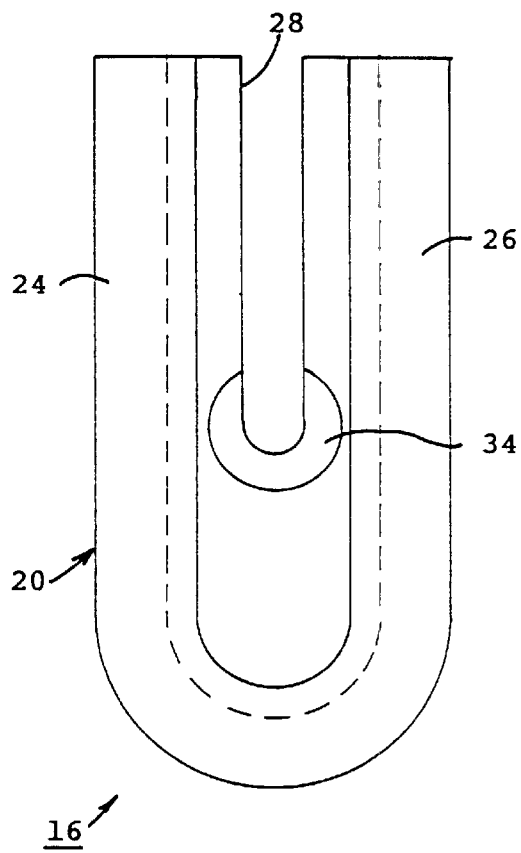
FIG. 4 is a plan view of FIG. 3.
Figure 5:
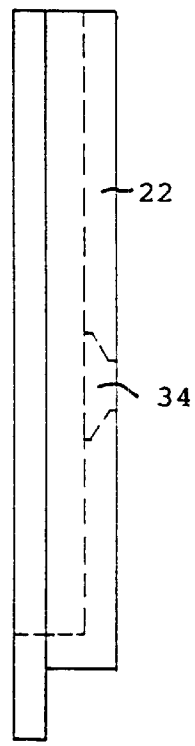
FIG. 5 is a side view of FIG. 4.
Figure 6:
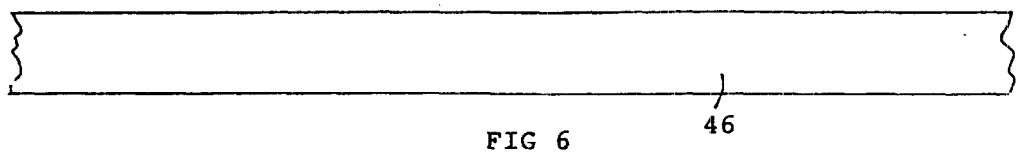
FIGS. 6 to 11 represent the successive steps of the assembly and fixing process of the slats.

FIG. 1 shows pre-positioning of the screw 30 before final fixing of the slats 12, 14. Tightening of the screw 30 is illustrated in FIG. 2, which tightening causes a uniform distribution of the pressure forces on the two securing wings 24, 26 urging the two slats 12, 14 downwards. A fixing device of this kind does not require holes to be pre-drilled in the wooden slats 12, 14 and thereby prevents moisture from seeping up by capillarity effect.

The gap L2 of small thickness hides most of the head 32 of the screw 30 and the only part remaining visible is the gripping indentation 44 for the tool to grip.

The different steps of the assembly process of the slats 12, 14 . . . without visible screws are represented in FIGS. 6 to 11.

Figure 7:
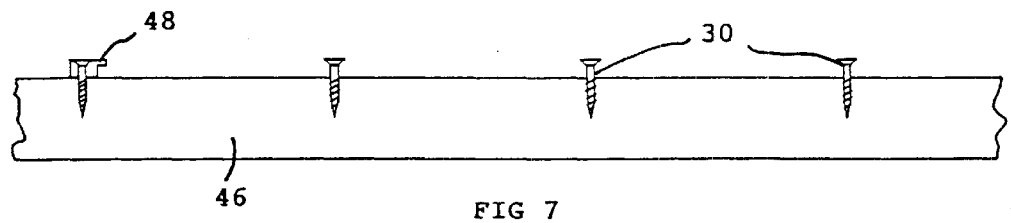
Figure 8:
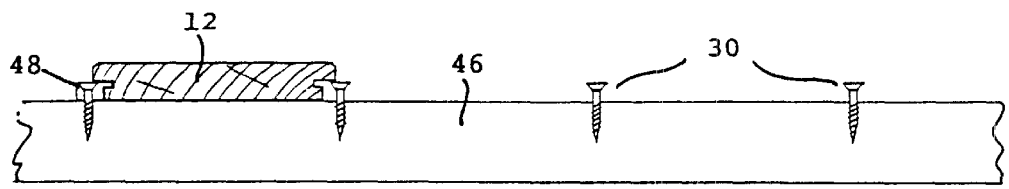

After sleepers 46 have been fitted (FIG. 6), the screws 30 are inserted and partially tightened at preset places on the sleepers 46 letting the non-threaded upper part protrude out (FIG. 7). A stop 48 equipped with a single securing wing is used to wedge the slat 12 in place at the beginning of the first row (FIG. 8).

Figure 9:
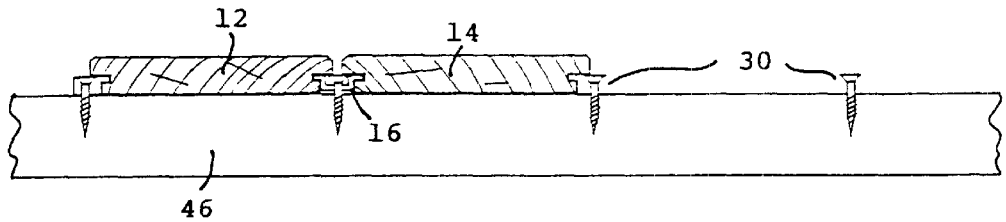

In FIG. 9, the fixing element 16 is fitted in the grooves 36, 38 of the two juxtaposed slats 12,14 and is moved until it comes into engagement at the end of travel against the non-threaded part of the screw 30. The sliding movement is possible due to the straight aperture 28 arranged in the base part 22.

Figure 10:
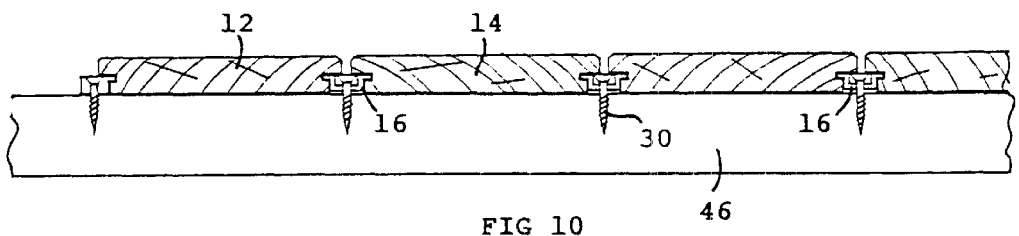

FIG. 10 shows the next step of assembly for the slats of the other parallel rows. The screws 30 all remain in the non-tightened position when the slats are fitted.

Figure 11:
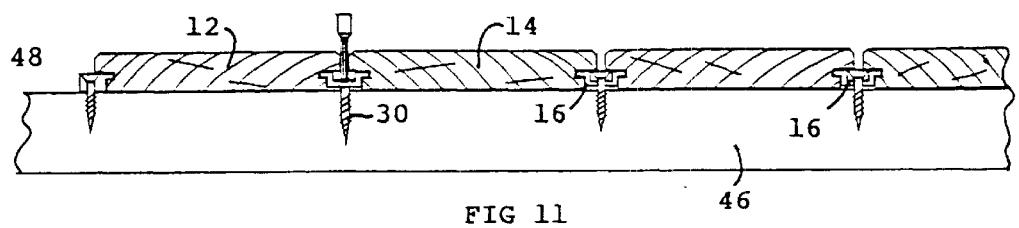

Final tightening of the screws 30 takes place when the slats have all been fitted and the corresponding fixing elements 16 inserted (FIG. 11). The gap L2 between the slats 12, 14 . . . is just sufficient for the tool to pass.

A wooden terrace built according to the above-mentioned process is easy to achieve and quick to assemble. Permanent access to the gripping indentations 44 of the screw heads 32 also enables the screws 30 to be unscrewed should it be required to disassemble the wooden slats.

Figure 12:
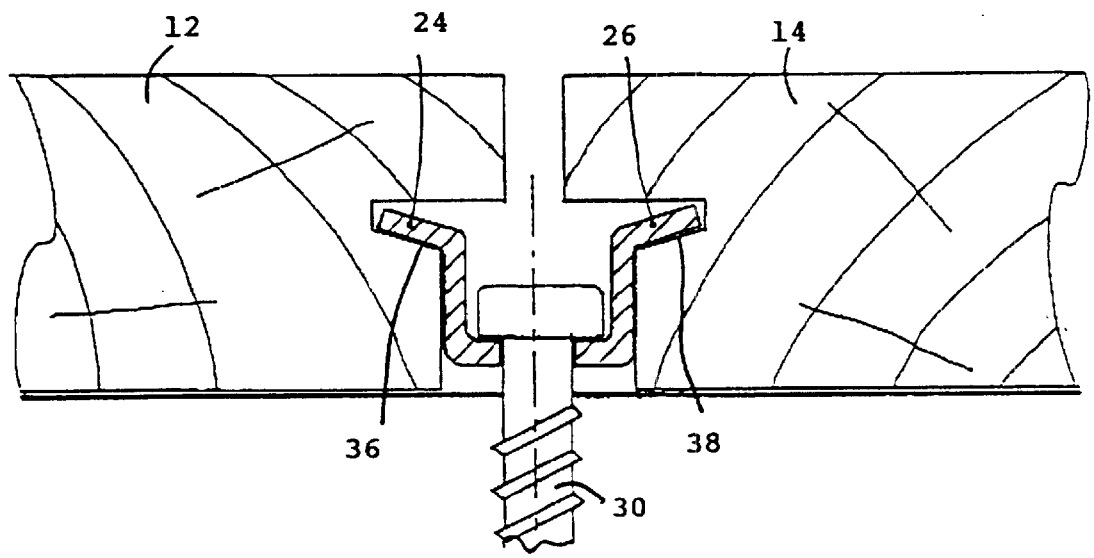
FIG. 12 represents an identical view to FIG. 2 of an alternative embodiment.
Figure 13:
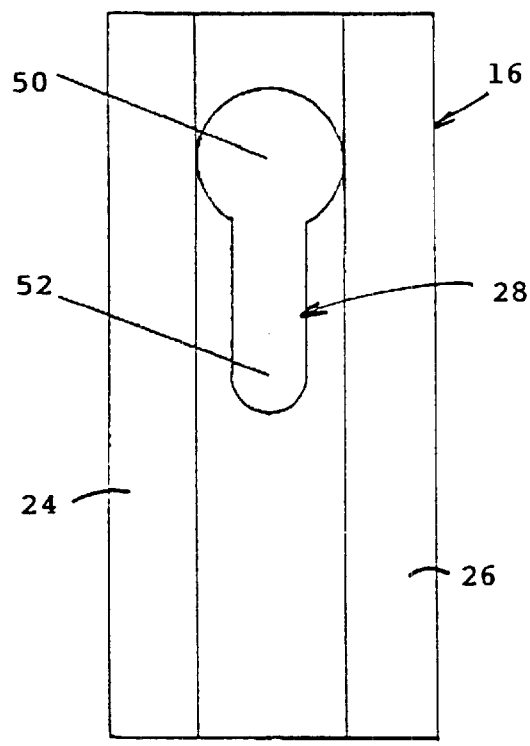
FIG. 13 is a plan view of the fixing element according to FIG. 12.

In the alternative embodiment of FIGS. 12 and 13, the two opposite-securing wings 24, 26 of the fixing element 16 are convergent instead of being coplanar as in FIG. 1. The positioning grooves 36, 38 arranged side by side in the side faces of the slats 12, 14 have at least one inclined bearing face. The metal fixing element 16 is made of deformable stainless steel giving it an elasticity effect so as to compensate for the retraction and dilatation of the wood without any decrease of the securing force of the screw 30. The bottom of the fixing element 16 is provided with a buttonhole having a circular opening 50 for the screw head to pass through, and a groove 52 of smaller width than the screw head.

What is claimed is:

1. An assembly device for assembling two parallel wooden slats without visible screws, comprising an intercalated fixing element engaged in two positioning grooves arranged side by side in the side faces of said slats separated by a first invisible lower gap, and a fixing screw working in conjunction with the fixing element to perform securing of the two slats, wherein the fixing element comprises a metal slide having:

a base part equipped with an oblong aperture extending longitudinally in the central part for the screw to pass through, the external width of the base part determining said invisible first gap between the bottom edges of the two slats;

two securing wings oriented in opposite directions from one another and designed to press in the grooves when the screw is tightened; and a screw head whose external dimension is greater than a visible second gap which is arranged above the grooves between the upper edges of the two wooden slats, the thickness of the second gap is smaller than that of the first gap and hides most of the head of the screw, except for the central part where the gripping indentation for a tool to grip is located.

2. The assembly device according to claim 1, wherein the base part of the slide presents a U-shaped section, and a dish at the closed end of the aperture to house the screw head when the screw has been screwed fully tight.

3. The assembly device according to claim 1, wherein the fixing element and the screw are made of stainless steel.

4. The assembly device according to claim 1, wherein the fixing element has two convergent opposite securing wings working in conjunction with at least one inclined bearing face of the positioning grooves arranged side by side in the side faces of the slats.

5. A process for assembly of wooden slats to make a floor or an outside terrace, characterized by the following successive steps:

partially screwing at least one screw into a bracing sleeper so as to leave the head of the screw protruding out, then fitting two wooden slats parallel to one another in a direction perpendicular to the sleeper, inserting a fixing part in the form of a slide in the lateral grooves with a longitudinal sliding movement, and screwing the securing screw fully tight to achieve final securing of the two slats.

\* \* \* \* \*